(12) United States Patent
Goodman et al.

(10) Patent No.: US 9,699,453 B1
(45) Date of Patent: Jul. 4, 2017

(54) METHODS AND APPARATUSES FOR VIDEO ENHANCEMENT AND VIDEO OBJECT TRACKING

(71) Applicant: Raytheon Company, Waltham, MA (US)

(72) Inventors: Vernon R. Goodman, Rockwall, TX (US); Rebekah Montgomery, Dallas, TX (US)

(73) Assignee: Raytheon Company, Waltham, MA (US)

( * ) Notice: Subject to any disclaimer, the term of this patent is extended or adjusted under 35 U.S.C. 154(b) by 532 days.

(21) Appl. No.: 14/340,730

(22) Filed: Jul. 25, 2014

(51) Int. Cl.
| | | |
|---|---|---|
| *H04B 1/66* | (2006.01) | |
| *H04N 7/12* | (2006.01) | |
| *H04N 11/02* | (2006.01) | |
| *H04N 11/04* | (2006.01) | |
| *H04N 19/85* | (2014.01) | |
| *G06T 5/00* | (2006.01) | |
| *H04N 19/119* | (2014.01) | |
| *H04N 19/137* | (2014.01) | |
| *H04N 19/126* | (2014.01) | |
| *H04N 19/29* | (2014.01) | |
| *H04N 19/86* | (2014.01) | |

(52) U.S. Cl.
CPC ......... *H04N 19/00903* (2013.01); *G06T 5/00* (2013.01); *H04N 19/119* (2014.11); *H04N 19/126* (2014.11); *H04N 19/137* (2014.11); *H04N 19/29* (2014.11); *H04N 19/86* (2014.11)

(58) Field of Classification Search
CPC .. H04N 19/119; H04N 19/126; H04N 19/137; H04N 19/29; H04N 19/86
USPC .................................................. 375/240–241
See application file for complete search history.

(56) References Cited

U.S. PATENT DOCUMENTS

| | | |
|---|---|---|
| 7,760,805 B2 | 7/2010 | Owens |
| 8,830,340 B2 | 9/2014 | Burt et al. |
| 8,860,793 B2 | 10/2014 | Lo et al. |

OTHER PUBLICATIONS

"U.S. Appl. No. 14/340,724, Notice of Allowance mailed Apr. 8, 2015", 9 pgs.
Goodman, Vernon R., et al., "Methods and Apparatuses for Image Enhancement", U.S. Appl. No. 14/340,724, filed Jul. 25, 2014, 24 pgs.

*Primary Examiner* — Dominic D Saltarelli
(74) *Attorney, Agent, or Firm* — Schwegman Lundberg & Woessner, P.A.

(57) ABSTRACT

Embodiments of a method and apparatus for video enhancement are generally described herein. In some embodiments, the method includes accessing a first frame of the video. The first frame can include pixel data with intensity values within one of a number of non-overlapping ranges of intensity values. The method can further include compressing the intensity values of the first pixel data to generate non-linearly compressed (NLC) pixel data such that the intensity values are compressed into smaller ranges of intensity values. The method can further include upsampling the NLC pixel data based on an upsampling ratio. The method can further include decompressing the intensity values of the upsampled pixel data by reassigning intensity values of the upsampled pixel data to intensity values in the original intensity value ranges. Other example methods, systems, and apparatuses are described.

20 Claims, 6 Drawing Sheets

METHODS AND APPARATUSES FOR VIDEO ENHANCEMENT AND VIDEO OBJECT TRACKING

TECHNICAL FIELD

Some embodiments relate to video compression and restoration. Some embodiments relate to methods for enhancing videos for improving usability of videos and images from videos captured for surveillance applications.

BACKGROUND

Videos and images from videos acquired by cameras or other imaging systems often undergo enhancement to improve resolution, so that low-level features in the video's image data can be detected. Ongoing efforts are directed to improving these enhancement methods so that more information can be obtained from videos and images.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
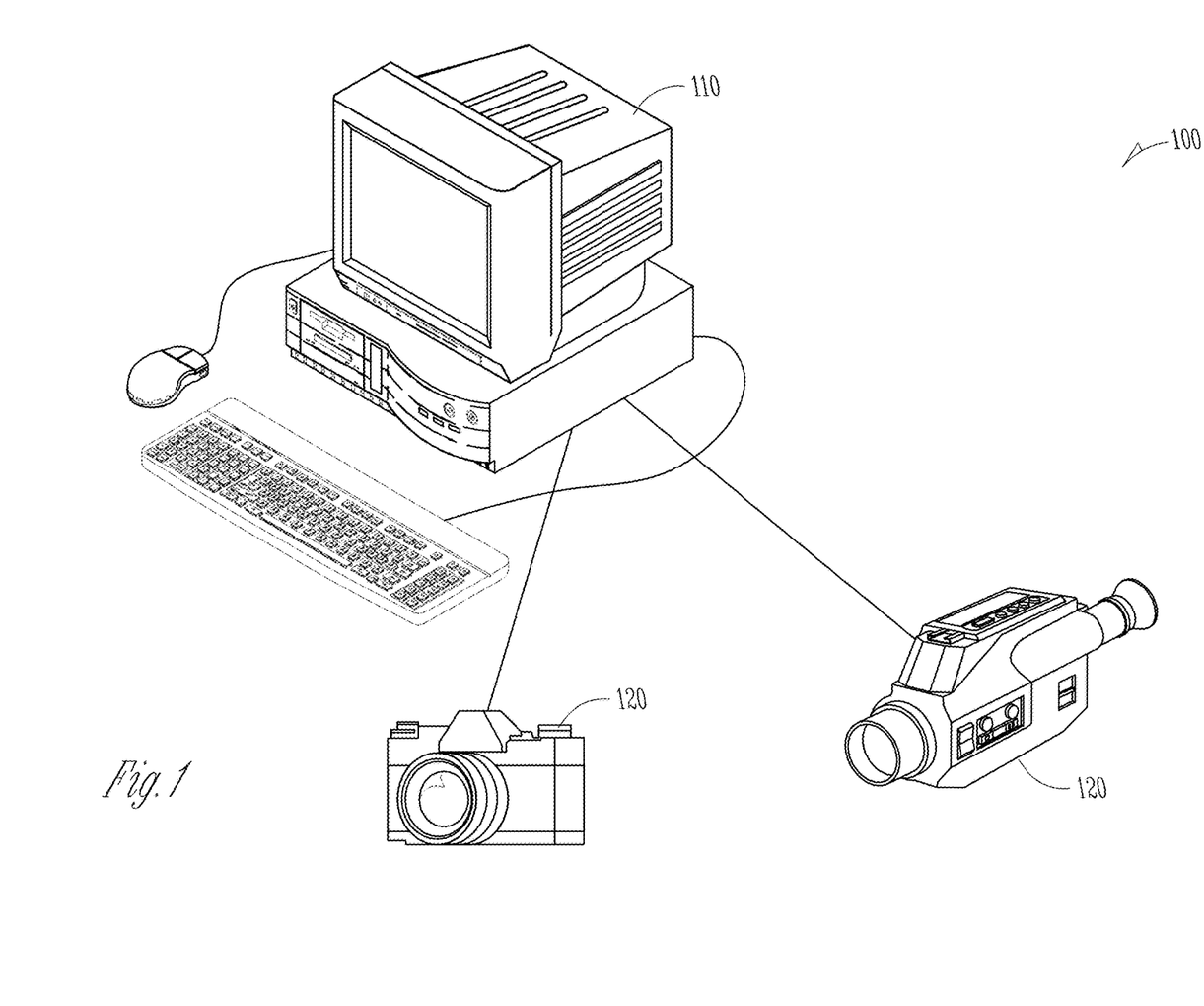
FIG. 1 is a system in which example embodiments may be implemented.

FIG. 1 is a system 100 in which example embodiments may be implemented. The system 100 includes a computing system 110. The computing system 110 can receive pixel data from one or more video capturing modalities such as a surveillance camera 120, or other type of camera or imaging apparatus or a network of cameras or other computer systems or storage devices. The pixel data will be representative of frames of a video, and can include a number of pixels. The pixel data will be represented in a first domain, for example the pixel domain, and the pixel data for each frame of the video will have an array dimension corresponding to the number of pixels.

It may become necessary to enhance the resolution of frames of a video, for uses such as object identification, and recognition, fine measurement, and non-literal analysis. Some currently-available methods for enhancing resolution (e.g., "super-resolution") use wavelet-based techniques or pixel domain techniques to replicate pixels and convolution kernels for image smoothing of video frames. Such currently-available systems can be computationally expensive.

In addition to being computationally expensive, current methods and algorithms for super-resolution may not provide the necessary or preferred level of enhancement. For example, some currently-available methods can at best provide super-resolution of images from full motion video at enhanced resolutions of about a 3-to-1 ratio in one dimension (i.e., 9-to-1 pixels). Some current methods use image oversampling in the image domain and local convolution smoothing, followed by registration and image addition. In the up-sampling, much of the information is lost because of the smoothing techniques used, resulting in an image that has a resolution or quality lower than that which may be desired or necessary for all applications, especially in the case of images that are recreated from lossy compression. For at least these reasons, some methods may not provide sufficient resolution improvement for some applications.

Figure 2:
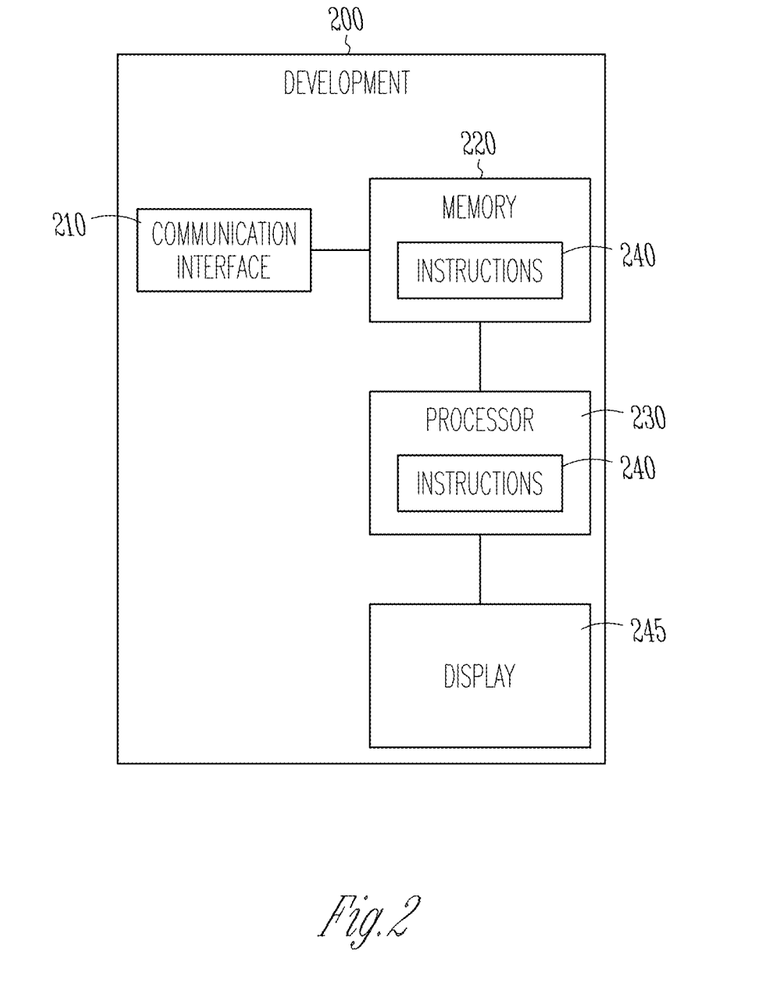
FIG. 2 is a block diagram of a system for implementing procedures in accordance with some embodiments.

FIG. 2 is a block diagram of a computer 200 for implementing methods to improve or enhance resolution and quality of video data according to example embodiments. The computer 200 may be appropriate for performing the functionalities of the computer system 100 (FIG. 1).

The computer 200 will include a communication interface 210. The communication interface 210 will retrieve frames of video data from video capturing modalities or image storing systems (e.g., cameras 130 of FIG. 1). The video data will include a number of frames of pixel data. The pixel data will represent images and the pixel data will include a number of pixels. The pixel data can be initially represented in the pixel domain. The pixel data can include an array with array dimensions corresponding to the number of pixels in the image data.

The computer 200 includes at least one processor 230. The processor 230 can perform edge detection to refine edges in the pixel data to generate edge-enhanced image data. The processor 230 can transform the edge-enhanced image data from into a second domain such as the frequency domain. The processor 230 can upsample the transformed image data based on an upsampling ratio to generate upsampled data, using algorithms or other methodologies described in further detail below. The processor 230 will transform the upsampled data back into the pixel domain to generate second pixel data. The second pixel data can have larger array dimensions than did the original pixel data described earlier, wherein the larger array dimensions correspond to the upsampling ratio that was applied to the frequency domain image data.

In some cases, for example when the processor 230 performs upsampling in the frequency domain, the Gibbs phenomenon can cause "ringing" artifacts to be introduced into video frame data, particularly in portions of an image or video frame where there is a bright object or glint, such as from light impinging on a glass surface or other shiny surface. Ringing artifacts can be created when the processor 230 combines images that have been upsampled in the frequency domain to make a video of the combination of images. Example embodiments prevent or remove ringing artifacts using algorithms as described below.

In some embodiments, the processor 230 can reduce or eliminate the ringing artifacts through use of a non-linear compression (NLC) algorithm that compresses intensity values of the pixel data before the pixel data is transformed to the frequency domain. When the processor 230 obtains pixel data representative of frames of the original video, the pixel data will have original intensity values within a range of intensity values. For example, pixel data may have original intensity values ranging from 0 (low intensity) to 255 (high intensity). This range can further be broken into smaller ranges. For example, a pixel of the pixel data can have an intensity value within a low-intensity range, for example from 0 to 50, or 0 to 100, or a pixel can have an intensity value within a high-intensity range of higher intensity values.

The NLC algorithm will reduce the ranges of intensity values for the pixel data by reassigning pixels to intensity values within smaller sub-ranges. The NLC algorithm will operate in a non-linear fashion such that each sub-range can be of a different size than at least one other sub-range. For example, the processor 230 may reassign pixels with original intensity values within a first range (e.g., 0-50) to new intensity values within a sub-range (e.g., 20-30) of the first range. The processor 230 may reassign pixels with original intensity values within a second range (e.g., 200-255) to new intensity values within a sub-range (e.g., 200-205) of the second range, wherein the sub-range of the first range includes a greater or lesser number of intensity values than are included in the sub-range of the second range. By compressing intensity values, ringing artifacts can be reduced or eliminated.

Example embodiments can further reduce or eliminate the ringing artifacts through use of a two-dimensional (2D) windowing algorithm. A 2D windowing algorithm in accordance with some embodiments can operate to detect a border area of the pixel data that has previously been compressed using the above-described NLC algorithm. The 2D windowing algorithm can then reduce intensity values of pixels that are within a threshold distance of the border area.

Table 1 is example pseudocode of an algorithm for reducing or eliminating ringing artifacts. The algorithm can be implemented using MATLAB or any other programming language. However, embodiments are not limited to any particular implementation of the algorithm.

TABLE 1

Pseudocode for reducing or eliminating ringing artifacts.

1: Perform NLC on pixels in the target area
2: if edge detection desired
3: {
4:    subtract a percentage of the average intensity
5: }
6: 2D Window the target area
7: Upsample target area using a 2D PPT (FFT, zero pad, Inverse FFT)
8: Inverse NLC the resulting image In line 1, the processor 230 implements an NLC algorithm as described earlier herein to compress intensity values of pixels to be within smaller intensity value ranges than was originally the case. The processor 230 may receive a selection of a target area either through a human or machine operator input, or a software algorithm may determine a size or location of a target area and provide identification information such as geographical coordinates of the target area, to other modules or algorithms executing on the processor 230. The processor 230 may apply compression techniques and other techniques to only this target area, although embodiments are not limited thereto.

In lines 2-5, the processor 230 performs edge detection, if parameters or preferences indicate that edge detection should be performed. In line 6, the processor 230 performs 2D windowing as described earlier herein. In line 7, the processor 230 performs upsampling on the target area. Edge detection and upsampling are described later herein with reference to Table 3. In line 8, the processor 230 decompresses the NLC compressed pixel data. For example, the processor 230 may decompress the intensity values of the upsampled pixel data by reassigning intensity values of the upsampled pixel data to original intensity values that were assigned before execution of the NLC algorithm, or to other intensity values.

In some embodiments, the processor 230 will add images, representative of sequential frames of video data, to provide an overall image that has a higher resolution than any individual image. Each image may have been previously subjected to ringing artifact removal algorithms, such as for example the algorithm described with reference to Table 1. In some embodiments, the image will be of an object or area of interest in the video. The processor 230 may implement various algorithms based on different criteria to determine whether any particular image should be added to the accumulated image.

As a first non-limiting example, embodiments will add images to the accumulated image until a predetermined number of images have been added to the accumulated image. As a second non-limiting example, the processor 230 will calculate average differences between the first few frames based on, for example, pixel intensities for corresponding pixels in respective frames. If differences between subsequent frames exceed that threshold, algorithms in accordance with some embodiments will terminate addition of further frames. In other embodiments, images representing frames of video are added to the accumulated image until a threshold difference between a frame and the previous frame is detected. If the threshold difference is exceeded, algorithms can detect that a change has occurred in the images; for example, the aspect of the images has changed or a partial occlusion has entered the respective video frames, and algorithms in accordance with some embodiments will not add subsequent frames.

Table 2 is pseudocode of an algorithm for accumulating images. However, Table 2 shows only one possible algorithm, and embodiments are not limited thereto. The algorithm can be implemented using MATLAB or any other programming language. However, embodiments are not limited to any particular implementation of the algorithm.

TABLE 2 is pseudocode of an algorithm for accumulating images.

1: receive target area from user input or software selection
2: Clear the accumulated image
3: While more frames to integrate or until max number of desired frames is reached
4: do
5:    Get a bigger image (at least 50% bigger) around current target position
6:    Upsample_Image
7:    Register_Image (returns new target position and image difference)
8:    If this is one of the first few images then
9:       Accumulate total image difference
10:      Add the current image to the accumulated image
11:      Compute the maximum difference threshold
12:   Else
13:      If the image difference < threshold then
14:         Add the current image to the accumulated image
15:      Endif
16:   Endif TABLE 2-continued is pseudocode of an algorithm for accumulating images.

17: Endwhile
18: If desired, perform unsharp masking or other sharpening function on the accumulated image
19: Return the accumulated image In line 1, the processor 230 receives a selection of a target area within a frame for which super-resolution is requested. The selection may be software-automated based on anomaly detection or any other event or criteria, or the selection may be input by, for example, a human operator. However, embodiments are not limited to any particular target area selection method. The selection can include an object of interest within the frame.

In line 2, the processor removes previously-accumulated images from, for example, cache memory, the display 245, etc. In lines 3-17, the processor 230 adds images by first selecting a larger area around the target area at line 5. In some examples, the larger area may be 50% larger than the target area although embodiments are not limited thereto.

In line 6, the processor 230 upsamples a first image corresponding to the larger area. In embodiments, the processor 230 will upsample the NLC pixel data or non-compressed data based on an upsampling ratio to generate upsampled pixel data. Upsampling is described in more detail below with reference to Table 3. In line 7, the processor 230 registers the image, and returns a new target position and image difference. The registration will include an initial position of the object of interest and each frame will be registered with respect to the initial position of the object of interest. Then the frames will be overlaid to compensate for camera pointing movement. In lines 8-11, if the image is one of the first images in the video data, the processor 230 can compute a difference threshold above which further images will not be added to the accumulated image. Otherwise, in lines 12-15, the processor 230 will add the image to the currently-accumulated images of the target area unless the difference between that image and the accumulated image is above the difference threshold calculated in lines 8-11. In line 18, other sharpening algorithms, for example high pass and low pass filtering or other algorithms, can additionally be performed on the accumulated image. In line 19, the accumulated, super-resolution image is returned to a calling program to be displayed or saved for further processing, for example.

While one algorithm for accumulation of images has been described above, the processor 230 may integrate frames into the accumulated image based on other criteria or using other algorithms. For example, the processor 230 may detect target motion with respect to the image and integrate images into the accumulated image to compensate for any target motion.

The computer 200 further includes a user display 345 to display representations of one or more of the original pixel data, original video and frames of the video, NLC-compressed frames of the video, edge-enhanced image data, or any other graphical information related to or unrelated to the images or videos containing frames of images.

Embodiments can be used for sub-pixel recovery to provide higher resolution than is currently available for such applications as vehicle identification, targeted zooms in wide areas, long-range surveillance, etc. Some embodiments can provide, through super-resolution techniques described herein, sub-pixel materials analysis, recreation of finer 2D and three-dimensional (3D) details, and improved mensuration with increased National Imagery Interpretability Rating Scale (NIIRS) ratings.

The processor 230 can operate with various color modes including black and white, multi-spectral, four-band color, hyperspectral modes, and other color modes. The processor 230 can perform operations in three or more dimensions to enhance resolution for higher-dimensional imagery using technologies including, for example, LiDAR technologies and Passive 3D for registration with two-dimensional imagery using edge detection and enhancement in the frequency domain. Various portions of embodiments can be implemented, concurrently or sequentially, on parallel processors using technologies such as multi-threading capabilities.

In addition to ringing artifact removal and super-resolution techniques described above with respect to Tables 1 and 2, embodiments can provide increased accuracy for image-to-image registration, through use of upsampling and edge enhancement through edge-detection in frequency-domain data. In addition to implementing various algorithms on frequency-domain transformations of image data, the processor 230 can implement pixel domain analysis techniques. For example, some embodiments provide histogram clipping to further distinguish different colors, or intensities in the case of black and white images by removing a user-defined percentage of low and high intensity pixels, based on the application for which the images will be used, the brightness or darkness of the images, the conditions under which the images were captured, or other criteria. Embodiments can also stretch intensity values evenly across an intensity range.

Embodiments also provide for a submean algorithm in which the processor 230 refines the edges in the pixel data for a frame of video data by subtracting a fraction of a mathematical mean of intensities corresponding to the pixel data from pixel values of the pixel data. The processor 230 can apply a submean ratio in accordance with the submean algorithm, such that the processor 230 subtracts percentage of the mean from pixel values, where use of a smaller percentage will generate softer-edged images, and use of a larger percentage will generate sharper-edged images. The processor 230 will apply submean algorithms before any frequency domain processing, and the processor 230 will apply histogram processing after frequency domain processing.

In various embodiments, the processor 230 can apply high-pass filtering, low pass filtering, or both high pass and low pass filtering (i.e., band-pass filtering), in addition to or instead of upsampling, in the frequency domain using algorithms that take advantage of the property of conjugate symmetry. The processor 230 can use low-pass filtering to remove noise from frequency domain data, and the processor 230 can use high-pass filtering to perform edge detection.

In embodiments, the processor 230 implements upsampling algorithms to perform upsampling in the frequency domain by inserting zeroes into the frequency domain data representative of the image, based on a value which can be provided by a user or operator or retrieved from configuration files or other storage. The processor 230 can apply contrast stretching by removing a specified amount of information at the end and beginning of intensity bins in the pixel domain.

The processor 230 can apply image compression and restoration to allow operators to storage images in memory 220 or other memory at lower resolution with lower memory usage requirements, and expand images to a higher resolution for viewing. Operators can adjust parameters for contrast stretching by the processor 230 based on the type of image product that operators wish to generate for different applications, or intensities can be automatically adjusted in some embodiments to allow users to see finer detail in some images without requiring users to spend time performing manual adjustments.

Embodiments can apply weighted filtering to upsampled image data, or to filtered image data. Input parameters for weighted filtering can include whether to apply filters to the output only or whether to combine the output of the filter with the original image data, where parameters can further specify how much of the original image, as a percentage, is to be retained versus how much of the filtered image should be used. Embodiments can add the original upsampled image to edge-detected, filtered images in various weights and combinations to emphasize either edges, or detailed portions of the images.

Algorithm input parameters can include parameters specifying whether color or black and white processing should be performed. Input parameters can include an upsample ratio. Input parameters can further include specifications as to whether histogram equalization should be applied, and the amount of data to be removed from the top or the bottom for histogram trimming. Embodiments can perform a weighted level of filtering to emphasize edges, while performing less filtering emphasize a portion of an image at the expense of another portion.

Input parameters can define whether to apply low pass filtering, high pass filtering, or both or neither of high pass filtering and low pass filtering. Still further input parameters can define whether to subtract the mean of the pixel intensities, and if so whether only a ratio of the mean should be subtracted.

Table 3 is example pseudocode of an algorithm for frequency domain processing in accordance with some embodiments. The algorithm can be implemented using MATLAB or any other programming language. However, embodiments are not limited to any particular implementation of frequency domain processing.

TABLE 3

Pseudocode for image enhancement in the frequency domain.

1: Function UPSAMPLE(image, upsampleratio, submeanratio,
2:     lowpassratio, hipassratio)
3: if submeanratio > 0.0
4:     image = image − submeanratio*(mean of pixel intensities)
5: Fxy = fft(image)
6: upFxy = split the Fxy into 4 equal quadrants and place at the
7: corners of the upsampled FFT, placing 0's in the unfilled parts
8: of the upsampled FFT
9: if (lowpassratio < 1.0)
10:    upFxy = convolve(upFxy,
11: lowpass2Dwindow(lowpassratio*Nyquist/2)
12: endif
13: if (hipassratio > 0.0)
14: upFxy =
15: convolve(upFxy,hipass2Dwindow(hipassratio*Nyquist/2)
16: upimage = ifft(upFxy)
17: return (up image)

At lines 1-3, input parameters, including the input image data (which can be representative of, for example, a target area of a frame of video data as described earlier herein with reference to Table 1), upsampling ratios, low pass and high pass filter parameters, and other parameters as described earlier herein, are passed to the algorithm. In lines 3-4, if specified by input parameters to the algorithm, the processor 230 subtracts a specified ratio of mean pixel values from the image data. In line 5, the processor 230 performs a Fast Fourier Transform (FFT) on the input pixel data to generate frequency domain image data. In line 6, the processor 230 performs upsampling on the frequency domain data. This can be accomplished by splitting the upsampled frequency domain image data into four equal or nearly equal quadrants, and then placing values of zero in the unfilled portions of the upsampled frequency domain image data. It will be noted that the size of the upsampled frequency domain array is the product of the original image size and the upsampling ratio input parameter. Next, at lines 9-15, the processor 230 can perform high pass filtering, low pass filtering, or both, on the frequency domain data. Finally, at lines 16-17, the processor 230 transforms the frequency domain data back to the pixel domain, after the processor 230 has performed any requested filtering, upsampling, etc. in accordance with input parameters, and the processor 230 passes this processed pixel domain data back to other algorithms for display or further processing.

In some embodiments, the processor 230 performs image processing only in the pixel domain, for example the processor 230 may not apply frequency domain upsampling and filtering of frequency domain data, or the processor 230 can perform pixel domain image processing in addition to frequency domain processing. In some examples, pixel domain processing can include performing contrast histogram techniques on pixel domain data. An example algorithm for contrast histogram techniques is shown in the pseudocode of Table 4, below. However, it will be understood that the processor 230 can implement these or other algorithms in other manners besides those shown in Table 4, and these or other algorithms can be implemented with MATLAB or any other programming language:

TABLE 4

Pseudocode for pixel domain contrast enhancement.

1: Function contrast_hist(image, sperc)
2: Histo = build a histogram of the intensities in the image
3: Histotop = highest intensity < the highest sperc% of intensities
4: in Histo
5: Histobot = lowest intensity > the lowest sperc% of intensities in
6: Histo
7: Set all intensities in image > Histotop to Histotop
8: Set all intensities in image < Histobot to Histobot
9: Return (image)

In line 1, the image is passed to the algorithm, along with a parameter to specify the intensity level at which pixel data is to be removed. At line 2, a histogram plot is created. At lines 3-6, the processor 230 calculates the highest and lowest percentage intensities based on the input intensity level. At lines 7-9, the pixel values are examined to find those with values that are above the maximum threshold or below the minimum threshold, and the values are re-set to the appropriate upper or lower threshold if the values are found to be above or below the corresponding threshold, and the processor 230 passes back the enhanced image for further processing.

In example embodiments, frequency domain techniques are used to replace at least some pixel domain techniques. For example, rather than using large, sliding convolution kernels for smoothing after up-sampling, example embodiments provide upsampling and filtering in the frequency domain. Furthermore, some image enhancement algorithms, when performed in the frequency domain, can provide sharper edge detection than equivalent pixel-domain techniques.

The computer 200 includes memory 220. In one embodiment, the memory 220 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data. The memory 220 can store, for example, accumulated images and at least a subset of frames of the video data.

The computer 200 can include computer instructions 240 that, when implemented on the computer 200, cause the computer 200 to implement functionality in accordance with example embodiments. The instructions 240 can be stored on a computer-readable storage device, which can be read and executed by at least one processor 230 to perform the operations described herein. In some embodiments, the instructions 240 are stored on the processor 230 or the memory 220 such that the processor 230 or the memory 220 acts as computer-readable media. A computer-readable storage device can include any non-transitory mechanism for storing information in a form readable by a machine (e.g., a computer). For example, a computer-readable storage device can include ROM, RAM, magnetic disk storage media, optical storage media, flash-memory devices, and other storage devices and media.

The instructions 240 can, when executed on the computer 200, cause the computer 200 to access a frame of video, as described earlier herein. The frame can include pixel data, each pixel of the pixel data having an intensity value within one of a plurality of non-overlapping ranges of intensity values that includes at least a first range of intensity values and a second range of intensity values. The instructions can cause the computer 200 to compress the intensity values of the first pixel data to generate NLC pixel data such that pixels of the pixel data that have intensity values within the first range are reassigned to intensity values within a sub-range of the first range, and such that pixels of the pixel data that have intensity values within the second range are reassigned to intensity values within a sub-range of the second range. As described earlier herein, the NLC compression is nonlinear in the sense that the sub-range of the first range may include a different number of intensity values than are included in the sub-range of the second range. The instructions 240 can cause the computer 200 to upsample the NLC pixel data based on an upsampling ratio to generate upsampled pixel data. The instructions 240 can cause the computer 200 to upsample the transformed image data based on an upsampling ratio to generate upsampled data. The instructions 240 can cause the computer 200 to decompress the intensity values of the upsampled pixel data by reassigning intensity values of the upsampled pixel data to intensity values in the original intensity ranges of the input image, to generate decompressed pixel data.

Figure 3:
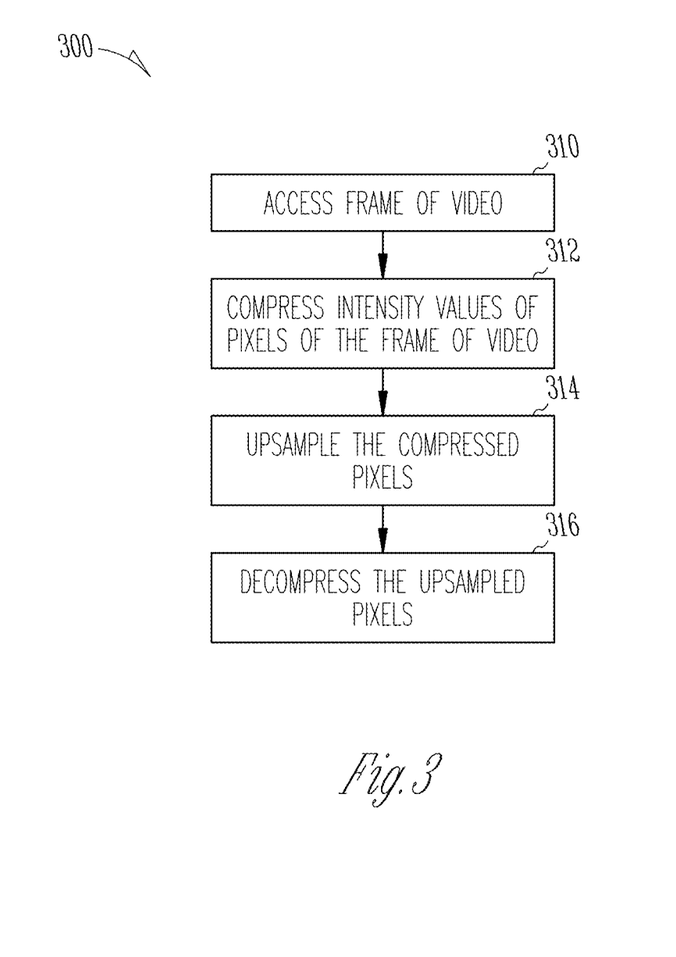
FIG. 3 is a procedure for video enhancement in accordance with some embodiments.

FIG. 3 illustrates a procedure 300 of video enhancement in accordance with some embodiments. The method may be performed by, for example, the processor 230 as described above.

In operation 310, the processor 230 accesses a frame of the video. The frame can include pixel data. Each pixel will have an intensity value within one of several of non-overlapping ranges of intensity values that includes at least a first range of intensity values and a second range of intensity values. However, embodiments are not limited to two ranges of intensity values; on the contrary there can be any number of ranges of intensity values.

In operation 320, the processor 230 compresses the intensity values of the pixel data to generate NLC pixel data as described earlier herein. In some embodiments, the processor 230 can also detect a border area of the NLC pixel data and reduce intensity values of pixels of the NLC pixel data that are within a threshold distance of the border area.

In operation 330, the processor 230 upsamples the NLC pixel data based on an upsampling ratio to generate upsampled pixel data.

In operation 340, the processor 230 decompresses the intensity values of the upsampled pixel data by reassigning intensity values of the upsampled pixel data to intensity values in the original ranges. The processor 230 may receive a selection of a target area including an object of interest within one or more frames of the video, and the processor 230 can thereafter perform one or more of the operations of example method 300 using a subset of the pixel data that includes the target area. The processor 230 can perform conditioning, such as edge enhancement, on the NLC pixel data to generate edge-enhanced data. The conditioning can include subtracting a fraction of a mathematical mean of intensity values corresponding to the compressed pixel data from the intensity values of the compressed pixel data. The processor 230 can transform the edge-enhanced data into the frequency domain by performing a Fast Fourier Transform (FFT) to generate transformed NLC pixel data, and the processor can perform upsampling operations on the transformed NLC pixel data.

As described earlier herein, the example method 300 can include, in some alternatives, performance of low pass frequency filtering, high pass frequency filtering, or band pass frequency filtering. This filtering can take place before upsampling operations although embodiments are not limited thereto. The example method 300 can further include contrast stretching, histogram processing, and any other frequency domain or pixel domain image processing technique.

Figure 4:
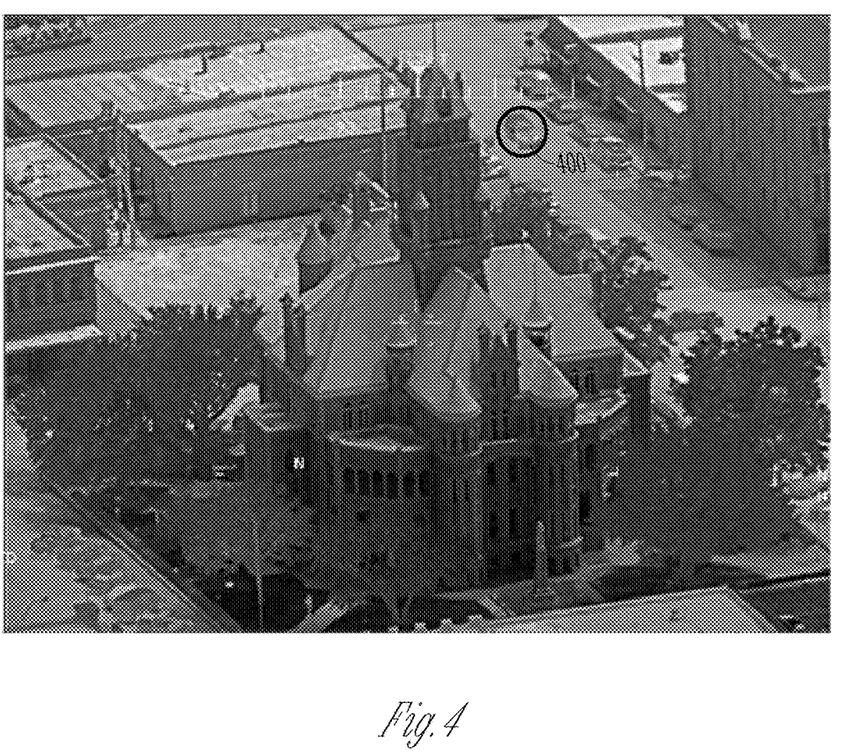
FIG. 4 is an example video frame to which video enhancement methods can be applied in accordance with some embodiments.

FIG. 4 is an example video frame to which video enhancement methods can be applied in accordance with some embodiments. In the illustrative example of FIG. 4, the target area of interest 400 is centered on a moving truck.

Figure 5:
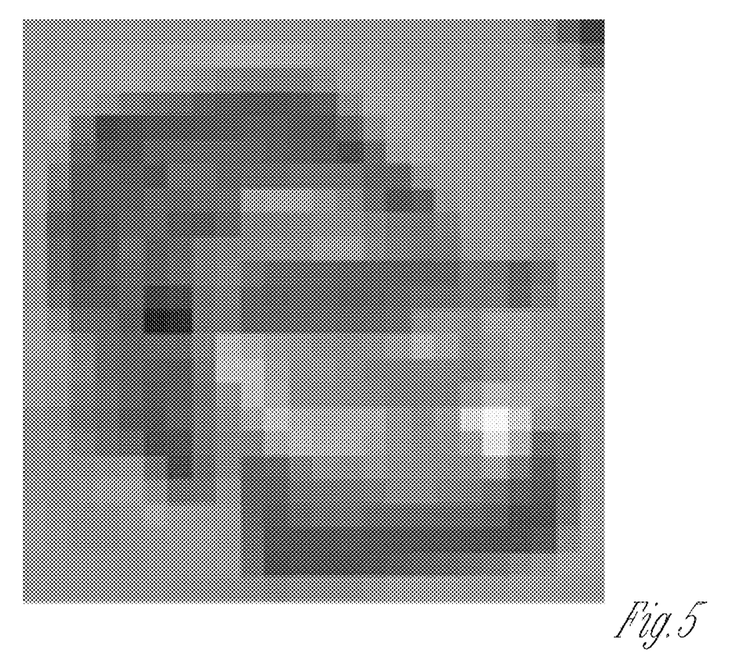
FIG. 5 is an example snippet of the video frame of FIG. 4 to which video enhancement methods can be applied in accordance with some embodiments.

FIG. 5 is an example snippet of the video frame of FIG. 4 to which video enhancement methods can be applied in accordance with some embodiments. In FIG. 5, the video frame of FIG. 4 has been trimmed to include only the target area of interest 400.

Figure 6:
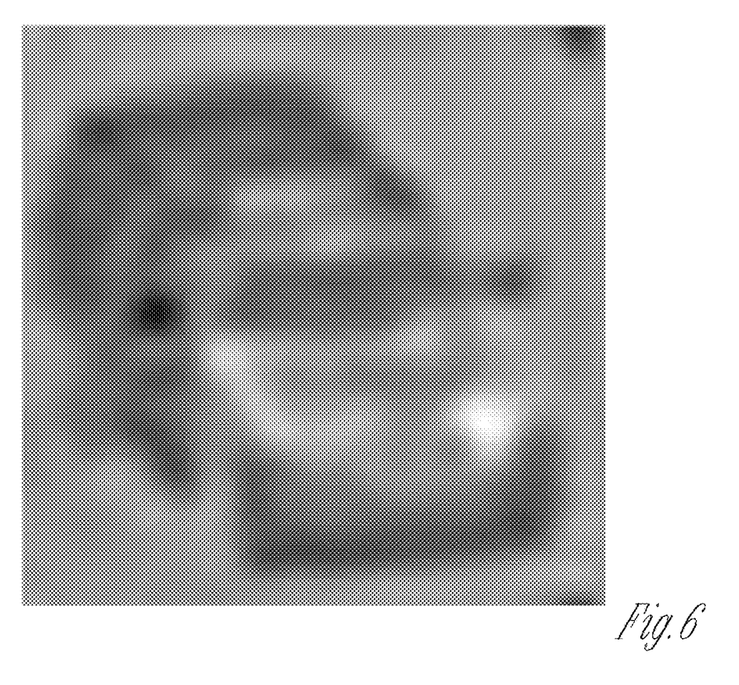
FIG. 6 illustrates enhancement of the target area of interest of FIG. 5, in which the target area of interest has undergone a first enhancement operation in accordance with some embodiments.
Figure 7:
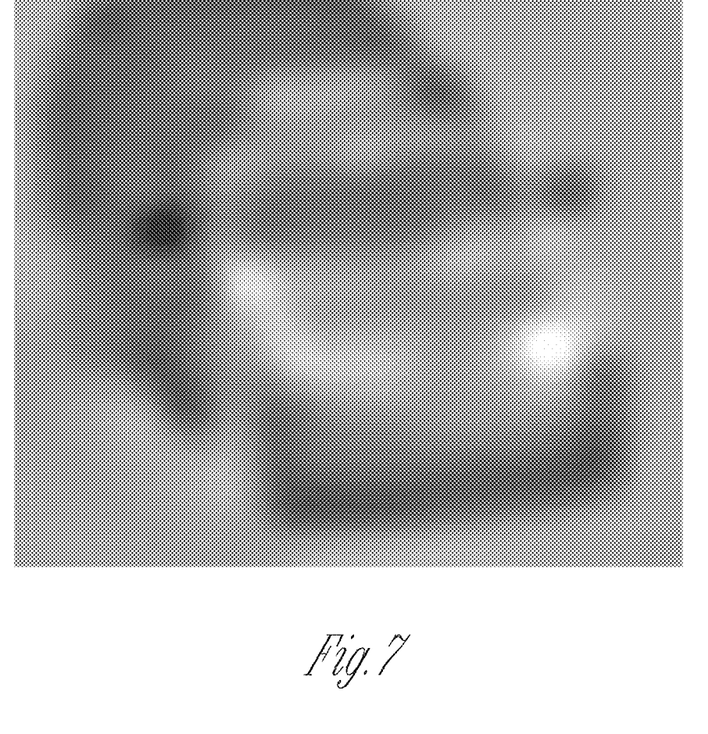
FIG. 7 illustrates enhancement of the target area of interest of FIG. 5, in which the target area of interest has undergone a second enhancement operation in accordance with some embodiments.

FIG. 6 illustrates enhancement of the target area of interest 400 of FIG. 5, in which the target area of interest has undergone a first enhancement operation in accordance with some embodiments. In the illustrative example of FIG. 6, the processor 230 has implemented upsampling, which can be implemented in a manner similar to that described above with reference to Tables 1-4, although embodiments are not limited thereto. FIG. 7 illustrates enhancement of the target area of interest 400 of FIG. 5, in which the target area of interest has undergone a second enhancement operation in accordance with some embodiments. In the illustrative example of FIG. 7, the processor 230 has implemented NLC compression and other de-ringing operations and image accumulation operations described earlier herein with reference to Tables 1-2 to generate an accumulated image shown in FIG. 7. While FIG. 6-7 shows at least some enhancements that the processor 230 can implement, the processor 230 can implement other enhancements including, but not limited to, high-pass filtering, low-pass filtering, edge detection, contrast stretching, etc.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method enhancing a video, the method comprising:
accessing a first frame of the video, the first frame including first pixel data, each pixel of the first pixel data having an intensity value within one of a plurality of non-overlapping ranges of intensity values that includes a first range of intensity values and a second range of intensity values;
compressing the intensity values of the first pixel data to generate non-linearly compressed (NLC) pixel data such that pixels of the first pixel data that have intensity values within the first range are reassigned to intensity values within a sub-range of the first range, and such that pixels of the first pixel data that have intensity values within the second range are reassigned to intensity values within a sub-range of the second range, wherein the sub-range of the first range includes a different number of intensity values than are included in the sub-range of the second range;
upsampling the NLC pixel data based on an upsampling ratio to generate upsampled pixel data; and
decompressing the intensity values of the upsampled pixel data by reassigning intensity values of the upsampled pixel data to intensity values in the first range and the second range, to generate decompressed pixel data.

2. The method of claim 1, comprising:
receiving a selection of a target area including an object of interest within the first frame, and wherein
operations of compressing the intensity values, upsampling the NLC pixel data, and decompressing the intensity values are performed using a subset of the first pixel data that includes the target area.

3. The method of claim 2, comprising:
registering the decompressed pixel data of the first frame to generate an initial position of the object of interest.

4. The method of claim 3, comprising:
accessing a second frame of the video;
compressing the intensity values of pixel data of the second frame to generate NLC pixel data for the second frame, upsampling the NLC pixel data for the second frame to generate upsampled pixel data for the second frame, and decompressing the intensity values of the upsampled pixel data for the second frame to generate decompressed pixel data for the second frame;
registering the decompressed pixel data for the second frame to generate a second position of the object of interest and a difference value to represent a degree of difference between the first frame and the second frame; and
adding data of the second frame to data of the first frame to generate an accumulated image.

5. The method of claim 4, comprising:
generating a difference threshold, to represent a difference value between a frame and the accumulated image, above which the frame will not be added to the accumulated image;
accessing additional frames of the video data;
registering pixel data of the additional frames of video data to generate a corresponding position of the object of interest and a corresponding difference value between the corresponding additional frame and the accumulated image; and
adding the corresponding additional frame of the video data to the accumulated image if the corresponding difference value is below the difference threshold.

6. The method of claim 2, further comprising:
detecting a border area of the NLC pixel data; and
reducing intensity values of pixels of the NLC pixel data that are within a threshold distance of the border area.

7. The method of claim 6, comprising:
conditioning the NLC pixel data for edge refinement to generate edge-enhanced data;
transforming the edge-enhanced data into the frequency domain by performing a Fast Fourier Transform (FFT) to generate transformed NLC pixel data;
providing the transformed NLC pixel data to the upsampling to generate the upsampled pixel data; and
transforming the upsampled pixel data to the pixel domain prior to restoring intensity values of the upsampled pixel data.

8. The method of claim 7, wherein
the conditioning includes subtracting a fraction of a mathematical mean of intensity values corresponding to the compressed pixel data from the intensity values of the compressed pixel data.

9. The method of claim 7, wherein the first frame includes color data, the color data including a plurality of different spectral bands and wherein the method further comprises transforming data of at least two of the plurality of different spectral bands to generate at least two color sets of frequency domain data.

10. An apparatus for performing video enhancement, the apparatus comprising:
a communication interface configured to retrieve frames of video data, including a first frame, from an image capturing modality, the first frame including first pixel data, pixels of the first pixel data having first intensity values within a first range of intensity values, the first range of intensity values being divided into a plurality of sub-ranges of intensity values including a first sub-range of intensity values and a second sub-range of intensity values, the second sub-range including intensity values greater than intensity values of the first sub-range;
one or more processors arranged to compressing the intensity values of the first pixel data to generate non-linearly compressed (NLC) pixel data such that pixels of the first pixel data that have intensity values within the first range are reassigned to intensity values within a sub-range of the first range, and such that pixels of the first pixel data that have intensity values within the second range are reassigned to intensity values within a sub-range of the second range, wherein the sub-range of the first range includes a different number of intensity values than are included in the sub-range of the second range;
upsampling the NLC pixel data based on an upsampling ratio to generate upsampled pixel data; and
decompressing the intensity values of the upsampled pixel data by reassigning intensity values of the upsampled pixel data to intensity values in the first range and the second range, to generate decompressed pixel data.

11. The apparatus of claim 10, further comprising an input device configured to receive a selection of a target area including an object of interest within the first frame, and wherein the one or more processors are further configured to compress the intensity values, upsample the NLC pixel data, and decompress the intensity values using a subset of the first pixel data that includes the target area.

12. The apparatus of claim 11, further comprising memory to store accumulated images and at least a subset of frames of the video data, and wherein the one or more processors are further configured to register the decompressed pixel data of the first frame to generate an initial position of the object of interest.

13. The apparatus of claim 12, wherein the one or more processors are further configured to:
  access a second frame of the video;
  compress the intensity values of pixel data of the second frame to generate NLC pixel data for the second frame, upsample the NLC pixel data for the second frame to generate upsampled pixel data for the second frame, and decompress the intensity values of the upsampled pixel data for the second frame to generate decompressed pixel data for the second frame;
  register the decompressed pixel data for the second frame to generate a second position of the object of interest and a difference value to represent a degree of difference between the first frame and the second frame; and
  adding data of the second frame to data of the first frame to generate an accumulated image.

14. The apparatus of claim 13, wherein the one or more processors are further configured to:
  generate a difference threshold, to represent a difference value between a frame and the accumulated image, above which the frame will not be integrated into the accumulated image;
  access additional frames of the video data;
  register pixel data of the additional frames of video data to generate a corresponding position of the object of interest and a corresponding difference value between the corresponding additional frame and the accumulated image; and
  integrate the corresponding additional frame of the video data into to the accumulated image if the corresponding difference value is below the difference threshold.

15. The apparatus of claim 11, wherein the one or more processors are further configured to:
  detect a border area of the NLC pixel data; and
  reduce intensity values of pixels of the NLC pixel data that are within a threshold distance of the border area.

16. The apparatus of claim 15, wherein the first frame includes color data, the color data including a plurality of different spectral bands and wherein the one or more processors are further configured to:
  condition the NLC pixel data for edge refinement to generate edge-enhanced data; and
  transform the edge-enhanced data of at least two of the plurality of different spectral bands into the frequency domain by performing a Fast Fourier Transform (FFT) to generate at least two color sets of transformed NLC pixel data.

17. A non-transitory computer-readable medium storing instructions that, when executed on a machine, cause the machine to:
  access a first frame of a video, the first frame including first pixel data, each pixel of the first pixel data having an intensity value within one of a plurality of non-overlapping ranges of intensity values that includes a first range of intensity values and a second range of intensity values;
  compress the intensity values of the first pixel data to generate non-linearly compressed (NLC) pixel data such that pixels of the first pixel data that have intensity values within the first range are reassigned to intensity values within a sub-range of the first range, and such that pixels of the first pixel data that have intensity values within the second range are reassigned to intensity values within a sub-range of the second range, wherein the sub-range of the first range includes a different number of intensity values than are included in the sub-range of the second range;
  upsample the NLC pixel data based on an upsampling ratio to generate upsampled pixel data; and
  decompress the intensity values of the upsampled pixel data by reassigning intensity values of the upsampled pixel data to intensity values in the first range and the second range, to generate decompressed pixel data.

18. The non-transitory computer-readable medium of claim 17, further comprising instructions that, when implemented on the machine, cause the machine to:
  receive a selection of a target area including an object of interest within the first frame; and wherein operations of compressing the intensity values, upsampling the NLC pixel data, and decompressing the intensity values are performed on a subset of the first pixel data that includes the target area; and
  register the decompressed pixel data of the first frame to generate an initial position of the object of interest.

19. The non-transitory computer-readable medium of claim 17, further comprising instructions that, when implemented on the machine, cause the machine to:
  detect a border area of the NLC pixel data; and
  reduce intensity values of pixels of the NLC pixel data that are within a threshold distance of the border area.

20. The non-transitory computer-readable medium of claim 19, further comprising instructions that, when implemented on the machine, cause the machine to:
  access a second frame of the video;
  compress the intensity values of pixel data of the second frame to generate NLC pixel data for the second frame, upsampling the NLC pixel data for the second frame to generate upsampled pixel data for the second frame, and decompressing the intensity values of the upsampled pixel data for the second frame to generate decompressed pixel data for the second frame;
  register the decompressed pixel data for the second frame to generate a second position of the object of interest and a difference value to represent a degree of difference between the first frame and the second frame; and
  add data of the second frame to data of the first frame to generate an accumulated image.

* * * * *